Patented Nov. 11, 1947

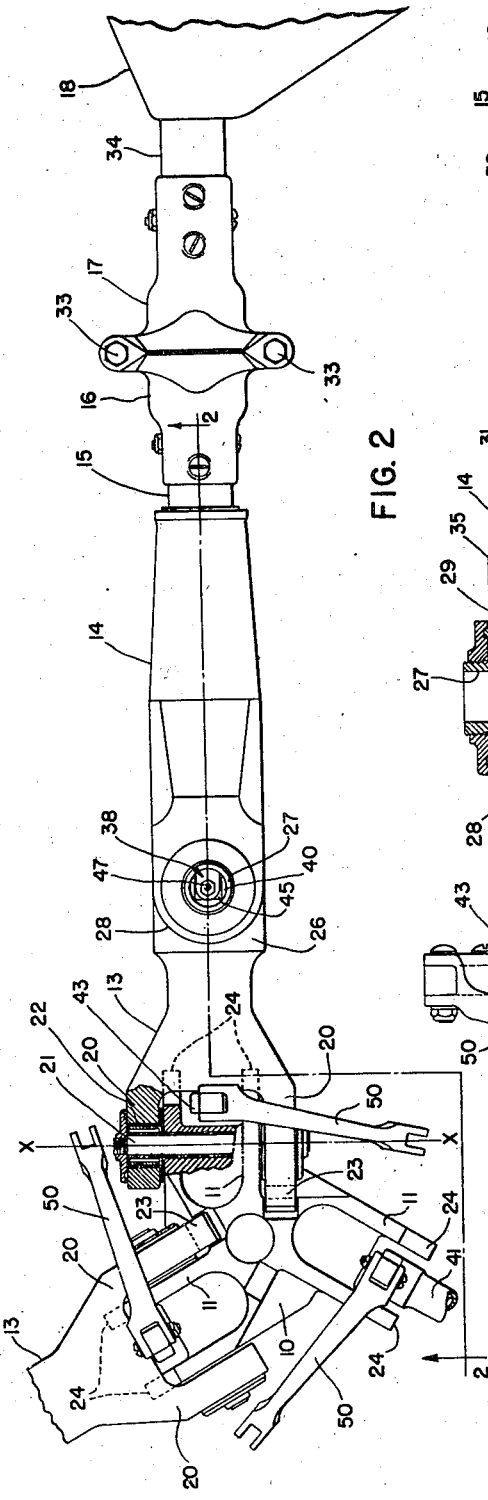
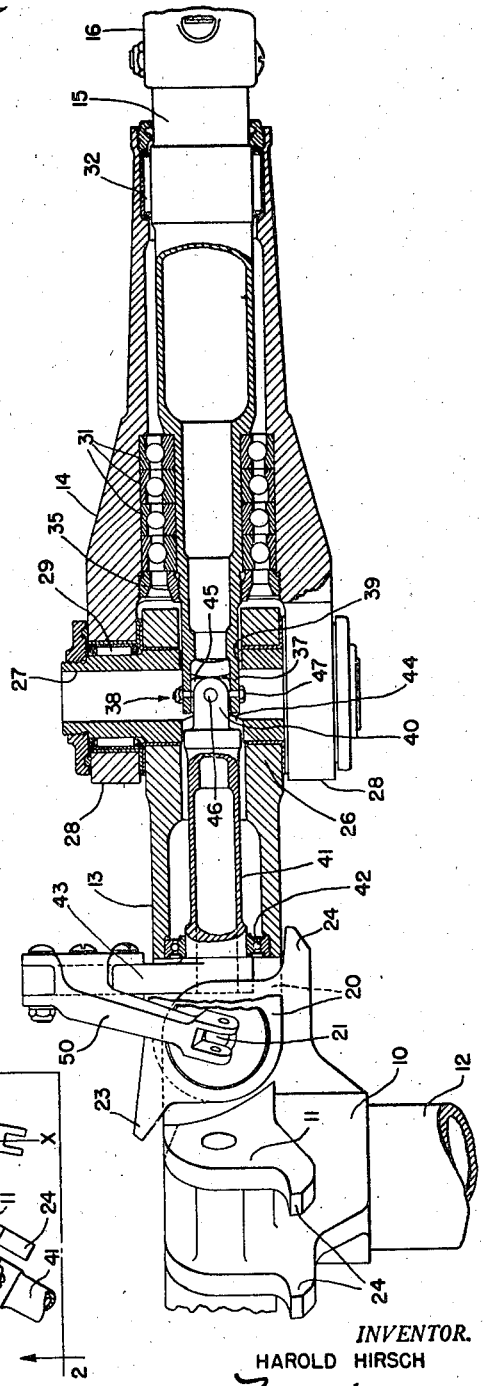

2,430,767

UNITED STATES PATENT OFFICE 2,430,767

PITCH CONTROL FOR ROTOR BLADES

Harold Hirsch, Buffalo, N. Y., assignor to Curtiss-Wright Corporation, a corporation of Delaware Application September 26, 1945, Serial No. 618,622

4 Claims. (Cl. 170—160)

The present invention relates to helicopter rotor blade assemblies and is particularly concerned with improved means for transmitting motion to the individual rotor blades for blade pitch adjustment.

This invention is particularly useful with helicopter rotor blade assemblies of the articulated type in which the blade is provided with a flapping hinge structure and a lead-lag hinge structure, each of these hinges being independently effective to permit the rotor blade a limited degree of motion for reasons now well understood in the art. In addition the rotor blades are arranged for movement in a direction to change the pitch or angle of incidence for control of the lift effect and for translational control of the helicopter as a whole. Heretofore considerable difficulty has been encountered in providing motion transmitting means for blade pitch change where the blade is articulated. This difficulty is due to the hinge structures, the kinematic coupling effect thereof and the need for adequate strength in the members used to support the rotating masses.

In the above noted form of rotor blade articulation it has been the common practice to arrange motion transmitting means in such manner that it necessitated complicated and heavy levers and links all of which had to be located externally of the blade hinge or articular assembly. The desired function of such a complicated system is not easily obtained as it necessitates placement of the levers and links in an exposed, unprotected area, introduces losses in aerodynamic efficiency and involves considerable expense in manufacture and maintenance.

The present invention is carried out by retaining the articulated type of rotor blade, in which the flapping link and the lead-lag link are separate parts of the assembly, and arranging the motion transmitting system internally of the articulated links. In so doing, the internal parts of the motion transmitting system are provided with a universal joint, one axis of which is arranged to be coincident with the axis of the lead-lag link hinge when the rotor is operating at its optimum condition. At the same time a motion transmitting link provided between the usual swash plate and the rotor blade is operatively connected to the internal parts of the system at a zone adjacent the axis of the flapping link hinge so that the end of the link directly connected to the swash plate intersects the projected axis of this latter hinge. Thus for optimum operating conditions the motion transmitting system will be effective to maintain blade pitch settings during blade motion about the respective hinge axes.

Accordingly, it is an object of this invention to overcome the noted objections of prior rotor blade pitch changing means by incorporating the same within certain parts of the rotor blade connecting assembly.

It is also an object of this invention to provide simple and light weight motion transmitting means for rotor blade pitch control which can be incorporated in the flapping and lead-lag hinge structures of the blade assembly.

A further object resides in the arrangement of rotor blade pitch control means for protective enclosure in the rotor blade retention means and in the incorporation of a universal connection at the lead-lag hinge axis so that substantially no interference can result in the blade pitch means or in the free action of the hinge structure.

Still another object may be found in the general arrangement of the motion transmitting means with respect to the blade hinge structures so that at normal operating settings of the blades there will be substantially no blade feathering effect while at operating conditions other than normal the blade feathering effect can be reduced to an insignificant factor.

Other features and objects of the present invention will be pointed out in the detailed description hereinafter to be given in connection with the preferred form of the same as illustrated in the accompanying drawing, in which:

Figure 1 is a top plan view of only so much of one typical rotor blade assembly as will serve to indicate the arrangement and construction of the motion transmitting means for blade pitch control; and Figure 2 is an enlarged, partial sectional detail, in elevation, of the assembly as seen along line 2—2 of Figure 1.

In the drawing the preferred rotor blade assembly includes a hub structure 10 arranged with laterally projecting boss structures 11 for the attachment of a plurality of rotor blades. In Figure 1 only one rotor blade assembly has been shown in detail as it is obvious that the remaining blade assemblies will be identical in all respects. This hub structure is carried on a vertical drive shaft 12 in the well known manner.

The typical rotor blade assembly illustrated is comprised of a pair of hinged links 13 and 14, a tubular element 15 carried by the link 14, a pair of cooperating blade attachment fittings 16 and 17 and the rotor blade 18. Link 13 is of hollow construction and is formed at one end with furcations 20 for attachment to the hub boss 11 by means of a pin 21 journaled in the boss and in needle bearings 22 in the link furcations (Figure 1). Thus link 13 can move or hinge about the pin 21 in a vertical plane within the limits imposed by the upper stop boss 23 formed on one furcation 20 and the lower stops 24 formed on the hub boss 11. Link 13 forms the flapping link member of the system above referred to.

The outer bifurcated end 26 of the link 13 is suitably formed to receive a hollow hinge pin 27, the axis of which is generally directed at right angles to the axis of the hinge pin 21. It should be understood that either or both of these hinge pins can be mounted at different angles from that shown depending upon the desirability of having the rotor blades function in a manner different from that expected with the arrangement disclosed. Whatever the angular arrangement may be for the respective hinge pins the furcations 28 of link 14 are supported on bearings 29 for hinging movement about the axis of the hinge pin 27. Thus the link 14 constitutes the lead-lag link for the blade 18.

In the present assembly the lead-lag link 14 carries a series of radial-thrust bearings 31 and a further needle bearing 32 for the mounting of the tubular element 15. The latter element projects outwardly of the link 14, and carries the fitting 16 to which the cooperating fitting 17 is suitably affixed by bolts 33 in any well known manner. In turn the fitting 17 is fixed to the blade spar member 34 so that forces developed when the blade is rotated will be transmitted inwardly through the assembly just described to the element 15. Element 15 is provided with a threaded collar 35 which can be adjusted to determine the longitudinal position of the element within the link 14 and at the same time bear against the thrust bearings 31 to transmit loads into the link and hence through the hinge connections to the hub structure 10.

Rotor blade pitch adjustments for an assembly of the character described are made by rotating the tubular element 15 relative to the lead-lag link 14 in which it is mounted. Thus the inner reduced end of the element 15 is bifurcated at 37 to provide one yoke fitting for a universal joint 38. This yoke end 37 extends through an aperture 39 in the tubular hinge pin 27 and is secured to a second yoke end 40 formed on a drive tube 41 extending through the flapping link 13. The drive tube is mounted for rotation in bearing 42 and is provided with an upwardly extending arm 43 which passes outwardly of the link 13 between the furcations 20. It is to be noted that the arm 43 has considerable latitude of movement between the link furcations so that an adequate degree of rotation of the drive member or tube can be had.

The yoke end 40 of drive member 41 passes into the hollow pin 27 through aperture 44 where it is joined to the cooperating yoke 37 by means of the usual swivel block 45 and pins 46 and 47. The pin 47 secures this universal joint in assembly by reason of its insertion through the pin 46 as is common practice. In actual practice the pin 47 of the universal joint 38 is movable to either side of coincidence with the axis of hinge pin 27 through less than 10 degrees in order to provide maximum pitch adjustment. In this manner the lead-lag hinge connection can function without interference from the blade pitch adjusting system which intersects the hinging or principal axis of the hollow pin 27. Moreover, the thrust collar 35 on element 15 will prevent tension loads being imposed on the universal joint 38.

The drive member 41 is adapted to be rotated by means of a link 50 which is rigidly connected at one end to the arm 43 and at the opposite end to a blade pitch control system (not shown). The control system, while not shown here, is understood to include a swash plate or equivalent agency together with means for effecting either group or cyclic pitch changes or both types of pitch changes of the rotor blades. The important portion of this complete control system is fully disclosed and includes the means for transmitting motion from the swash plate to the rotor blades through the hinged links 13 and 14. This above described system is believed to be a new and highly practical arrangement and accordingly constitutes the principal feature of the present invention. In a construction of the type described the assembly of the motion transmitting means internally of the links 13 and 14 will effectively nullify the kinematic coupling effect which otherwise imposes blade feathering motion upon the desired cyclic and/or group pitch settings if the universal joint is not greatly displaced from operative coincidence with the hinge axis of the lead-lag link. This condition will be satisfied easily according to the present invention whether the hinge axes are rectilinearly associated, as shown, or are directed at skewed angles. Moreover, this invention, when applied to a skewed axis articulated rotor blade, will effectively prevent increase of blade feathering motion by the pitch adjusting means as a result of the kinematic coupling action of the hinged links.

In the assembly and arrangement of the present motion transmitting means it will be noted that the link 50 is formed to have an offset and downwardly angling portion such that its free end intersects the projected axis X—X of the flapping hinge pin 21 (Figure 1). This particular positioning of the link 50 is arranged to occur when the rotor is operating at its best or optimum condition. When so positioned the flapping action of each blade assembly will not be accompanied by resultant motion of the link 50 and hence the blade will hold its selected pitch angle. Concurrently with the attainment of the link setting as above noted, the universal joint 38 is made to assume its best position with the axis of pin 47 coincident with the axis of the hollow lead-lag hinge pin 27. Thus leading and lagging motion of the blade 18 cannot introduce any change in the angle of pitch.

For blade pitch settings less than or greater than the normal as above noted, a slight blade feathering action is introduced but such action does not develop a condition having any substantial adverse effect on the characteristics of the blade operation and hence may be disregarded for all practical purposes.

The foregoing description has been devoted to the disclosure of one preferred and practical helicopter rotor blade assembly and pitch control transmitting means. It should be clear that identical assemblies are to be used for each blade whether there be one or more. The advantages attendant upon the improved motion transmitting means for rotor blades are simplicity of construction, adequate protection due to interior positioning of the operating parts, a clean rotor assembly, and effective blade pitch control with negligible feathering action for settings above or below a normal pitch angle. In attaining these advantages the link 50 should be arranged so that its end which connects with the swash plate (not shown) intersects or is never far from intersection with the projected axis X—X of the flapping hinge pin 21, and the universal joint 38 must lie on the axis of the lead-lag hinge pin 27.

It is assumed, of course, that modifications may be made herein and that equivalent means can be utilized for that shown without departing from the spirit and intended scope of the claims annexed hereto.

What is claimed is:

1. In an aircraft sustaining rotor assembly having blades provided with a hinged flapping link and a lead-lag link hingedly connected to the flapping link, the flapping hinge being spaced radially of the rotor assembly from the lead-lag link hinge, a pitch adjusting mechanism for each rotor blade including a drive member rotatively mounted in the flapping link, an element operatively carried in the lead-lag link and to one end of which the blade is attached, a universal joint operatively interconnecting one end of said drive member with the opposite end of said element, said universal joint having an axis which is movable to either side of a normal position of coincidence with the axis of the lead-lag hinge connection, and an operating link connected to said drive member for rotating the same whereby said element may be operated through said universal joint to adjust the rotor blade pitch.

2. In an aircraft sustaining rotor assembly having blades provided with a hinged flapping link and a lead-lag link hingedly connected to the flapping link, the flapping hinge being spaced radially of the rotor assembly from the lead-lag link hinge, a pitch adjusting mechanism for each rotor blade including a drive member rotatably mounted in the flapping link, a crank arm on said drive member which extends outwardly of the flapping link, an element operatively carried in the lead-lag link and to one end of which the blade is attached, a universal joint operatively interconnecting one end of said drive member with the opposite end of said element, and an operating link connected to the outwardly extending end of said crank arm for rotating said drive member whereby said element may be operated through said universal joint to adjust the rotor blade pitch, said operating link having one end arranged for movement to either side of a normal position intersecting the projected axis of the flapping link hinge.

3. In an aircraft sustaining rotor assembly having blades provided with a hinged flapping link and a lead-lag link hingedly connected to the flapping link, a pitch adjusting mechanism for each rotor blade including a drive member movably mounted in the flapping link, a crank arm on said drive member which extends outwardly of the flapping link, an element operatively carried in the lead-lag link and to one end of which the blade is attached, a universal joint operatively interconnecting one end of said drive member with the opposite end of said element, said universal joint having an axis which is movable to either side of a normal position of coincidence with the axis of the lead-lag hinge connection, and an operating link connected to the outwardly extending end of said crank arm for moving said drive member whereby said element may be operated through said universal joint to adjust the rotor blade pitch, said operating link having one end arranged for movement to either side of a normal position intersecting the projected axis of the flapping link hinge.

4. In an aircraft sustaining rotor assembly having blades provided with a hinged flapping link and a lead-lag link hingedly connected to the flapping link, a pitch adjusting mechanism for each rotor blade including a drive member rotatively mounted in the flapping link, a crank arm on said drive member which extends outwardly of the flapping link, an element operatively carried in the lead-lag link and to one end of which the blade is attached, a universal joint operatively interconnecting one end of said drive member with the opposite end of said element, said universal joint having an axis which is movable to either side of a normal position of coincidence with the axis of the lead-lag hinge connection, and an operating link connected to the outwardly extending end of said crank arm for rotating said drive member whereby said element may be operated through said universal joint to adjust the rotor blade pitch, said operating link having one end arranged for movement to either side of a normal position intersecting the projected axis of the flapping link hinge.

HAROLD HIRSCH.

REFERENCES CITED

The following references are of record in the file of this patent:

UNITED STATES PATENTS

| Number | Name | Date |
|---|---|---|
| 2,352,342 | Pitcairn | June 27, 1944 |
| 2,380,582 | Cierva | July 31, 1945 |
| 2,122,428 | Larsen | July 5, 1938 |
| 2,337,570 | Pullin | Dec. 28, 1943 |
| 2,338,923 | Focke | Jan. 11, 1944 |